United States Patent Office 3,427,127
Patented Feb. 11, 1969

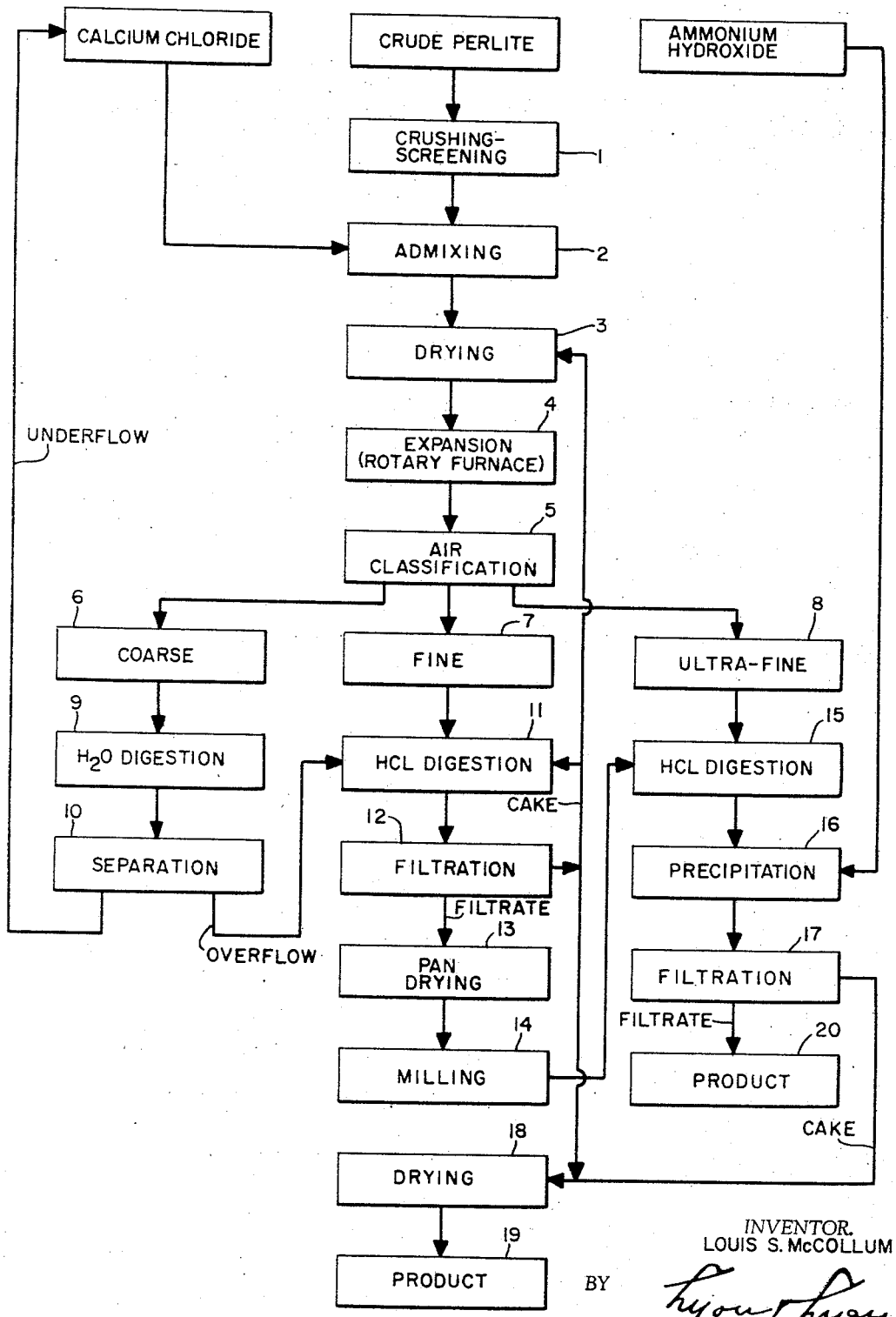

3,427,127
PROCESS FOR RECOVERING ALUMINUM VALUES
FROM HEAT EXPANDABLE MATERIALS
Louis Stanton McCollum, 104 Roxbury St.,
Santa Clara, Calif. 95050
Continuation of application Ser. No. 124,099, July 14,
1961. This application May 9, 1966, Ser. No. 548,792
U.S. Cl. 23—143                3 Claims
Int. Cl. C01f 7/02; C22b 3/00

ABSTRACT OF THE DISCLOSURE

In a process for the treatment of heat-expandable volcanic glasses of silicous-aluminous nature, the steps comprising admixing particles thereof with an inorganic chloride in sufficient proportion to combine with at least a portion of the aluminum in said particles, the amount of said chloride being above about 25%, based on the weight of said particles, drying said admixture at a temperature up to about 850° F., heating said admixture at a temperature in the range between about 1200 and 2000° F. for a time sufficient to expand the particles and to react said chloride salt with the particle consituents, cooling the expanded product, digesting said particles in water and separating the expanded particles and soluble materials, admixing the separated expanded particles with hydrochloric acid and digesting said admixture, separating the digested solubles from the solids, and recovering the aluminum values from said solubles.

---

This application is a continuation of S.N. 124,099, filed July 14, 1961, and now abandoned.

This invention relates to the production of aluminous materials and has particular reference to a process for the produciton of materials relatively high in alumina from raw materials of high silica and extremely low alumina content.

A primary object of the present invention is to provide a novel process for the production of a material of enhanced value by reason of its increased alumina content.

A further object of the present invention is to provide a process for beneficiating native ores to produce a product relatively high in alumina content suitable for use as a bauxite substitute in the conventional Bayer process for the production of metallurgical grade alumina.

The majority of the bauxite suitable for use in the Bayer process must be imported into the United States due to the lack of adequate native sources of desirably high alumina-content ores. Considerable effort has been directed toward development of the so-called lime-soda-sinter process for the production of alumina from relatively low-grade silicious aluminous materials such as anorthosite, shales, clays and the like. However, such processes are disadvantageous in that they require relatively expensive raw materials, they involve lengthy sintering operations and they require considerable mechanical processing, such as grinding, pelletizing, etc., of the characteristically dense, large particle size sinters produced thereby. Another object of the present invention is, therefore, to provide a process for the production of products of enriched alumina content which is not subject to these and other disadvantages of the prior art.

A further object of the present invention is to provide a process for the produtcion of a bauxite subtsitute which is inexpensive and readily adapted to commercial production on a large-scale basis.

Other objects and advantages of the present invention, it is believed will be readily apparent from the following detailed description of preferred embodiments thereof, when read in connection with the accompanying drawings.

In the drawings:

The single figure is a flow sheet illustrating the process of the present invention.

Briefly, this invention comprehends within its scope the discovery that pumiceous materials or glassy, volcanic ores such as perlite and pumice, readily lend themselves to chemical conversions to produce a composition from which products of relatively high alumina content and valuable by-products can be readily separated.

Crude or raw perlite ore is a volcanic glass having a silica content of about 65 to 70% by weight, together with about 12 to 16% alumina, 2 to 5% entrapped water, 7 to 10% alkali metal oxides, and small or trace amounts of oxides of iron, calcium and magnesium. A characteristic property of perlite and similar volcanic glasses containing upwards of 2% water is that when such material is exposed in fine particle form to temperatures in the range of 1500 to about 2100° F., softening and rapid expansion or puffing of the particles takes place to produce a cellular expanded product having an extremely low density. I have discovered that it is possible to make use of the unique geometric structure of the molecules within such pumiceous materials, which structure is apparently quite weak as compared to that found in clays, to carry out certain chemical reactions which transform the raw material into an intermediate product available for the recovery of aluminous products and others. Thus, I have found that crude perlite when relatively finely divided and admixed with cations such as the alkali and alkaline earth metals, notably sodium, potassium, calcium and magnesium in the form of the chlorides thereof, can be readily exfoliated to bring about, during the exfoliation process, substantial reaction between the cation and the alumina, producing a product which is susceptible to extraction of the alumina values therefrom.

In carrying out the process of this invention, the crude perlite, pumice or the like is crushed, ground and screened and then pre-treated with the inorganic chloride, preferably by spraying a concentrated aqueous solution of the chloride on the finely divided ore, the amount of chloride salt varying between 25 and 70% by weight, based on the weight of the ore. This admixture is dried, as in a rotary drier, but care must be taken not to exceed the temperature at which the combined water of crystalliz? ion of the raw material is driven out (about 850° F.).

The dried material just described becomes the furnace charge. When it is expanded under proper conditions through a perlite expanding furnace, preferably of the rotary type, as described below, an altered product of novel character and composition results. This material can be considerably attacked by acids and to a substantial degree by water alone. This is not true of expanded, untreated, perlite or pumice. This furnace product is distinctly different from so-called sinters from furnacing clays, shales, etc. No grinding, pelletizing or other mechanical treatment is required prior to subsequent processing. The product consists of finely divided, coke-like particles that are extremly lightly in weight with an interior porous, honeycomb-like structure of large surface area.

In carrying out the expansion-reaction, the dried material is fed to a gas stream entering the firing end of the expanding furnace. Upon combustion of the gas, sufficient heat is generated to expand and thus reduce the density of the treated particles. This alteration is accomplished at relatively high temperatures in a combustion zone where the gases are travelling at tremendous velocities and easily transport the lightweight, porous particles through the furnace. One important feature in this method of furnacing the charge lies in the dependence on carbon dioxide to expedite reactions of both chemical and physical natures; unlike other processes which require quantities of carbonates in the furnace charge to generate carbon dioxide, this process is conducted in an atmosphere high in carbon dioxide obtained from gases released from the perlite itself upon reaching the critical expansion temperature, and/or from the combustion gases which are in intimate contact with the particles. This method of producing a coke-like porous particle is also unique in that the accomplishment is obtained in transit, in a matter of seconds.

The reactions taking place under these conditions are physico-chemical by nature. As an illustration, when calcium chloride, or similar cations of sodium or magnesium, are used, a furnace of the following nature results:

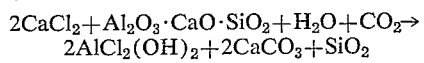

$$2CaCl_2 + Al_2O_3 \cdot CaO \cdot SiO_2 + H_2O + CO_2 \rightarrow$$
$$2AlCl_2(OH)_2 + 2CaCO_3 + SiO_2$$

Yet another advantage of this furnacing method to achieve finely divided materials composed of soluble and semi-soluble particles is that such particles are produced without first resorting to the expensive operation of producing a molten mass of reactive ingredients, subsequently to be treated with high velocity streams of steam, air or water; or to be allowed to cool then pulverized. In this invention a pyrolytic plasticity of individual reacting particles exists for perhaps a fraction of a second at the critical expansion temperature. This occurs at a sufficiently elevated temperature to literally explode as nuclear water and gases are released from reacting particles. This action is distinctly different from ordinary, incipient fusion which occurs only on the outer surfaces, accompanied by mild expansion. The explosive cation weakens the geometrical structure causing expansion during this pyroplastic instant which is a physical aid to chemical reactions occurring between the silicates and chloride.

The reaction temperature can be varied between about 1200 and 2000° F., the reaction time being only that required to expand or exfoliate the treated perlite. Maximum recovery appears to be obtained at temperatures in the range 1400–1800° F., temperatures below about 1400° F. not being conducive to sufficient reaction between the chloride and the perlite, and above 1800° F. a clinkering or densifying of the product begins, especially where the chloride salt content exceeds about 55%, based on the weight of the ore. Such clinkering requires longer times in carrying out the subsequent digestion operations, and if sufficiently serious would require objectionable grinding or crushing of the furnace product.

The furnace products are directly conveyed in a high velocity air stream, accompanied by the combustion gases, to suitable classifiers and cyclone collectors. Such procedure is not feasible with heavy, massive lumps, associated with sinter products from ordinary kilns or furnaces, unless an expensive pulverizing step, preceded by cooling, is done. In the process of this invention, the furnace product is sufficiently low in density and particle size to allow immediate discharge to the conveying air stream, which also supplies the necessary cooling effect, and thence to the classifiers.

Three classifications are desirable according to density and mesh size. This classification affords three sources of reactivable materials for subsequent processing. Each particle size and density range also differs somewhat in chemical composition due to unequal surface areas exposed during furnace reactions. This latter is a feature of the process which is highly important in succeeding operations. The separation produces a coarse material in the primary classifier. A finer material is discharged from the secondary classifier. The exhaust from this latter represents the ultrafine particles and are collected in a baghouse that also serves to evacuate the spent gases and excess air from the system.

The chloride-treated expanded perlite particles produced from the furnace can be made available for sale as such, or classified in various particle size ranges, for any desired use, such as raw matreials for further processing. Certain of the products have utility as such. For example, the classified ultra-fine material is an excellent mild abrasive. Preferably, however, the furnace products are further treated in an integrated process including the steps described above. Thus, the entire bulk of the solids from the furnace, or one or more of the three classifications described above, are digested in hydrochloric acid, preferably after a water wash or digestion step to remove and recirculate unreacted water soluble chlorides such as calcium chloride, the acid digestion producing a solution containing aluminum chloride, calcium chloride, and other acid-soluble solids including less than 1% silica on a solids basis. This solution is preferably neutralized to precipitate the aluminum as aluminum hydroxide, as by the addition of ammonium hydroxide to bring the pH within the range 6.5–7.5, leaving the calcium hydroxide in solution. The aluminum hydroxide precipitate is preferably blended with a portion of the solids remaining from the acid digestion steps to produce a bauxite substitute or supplement of desired silica-alumina ratio. Alternately, some or all of the precipitate is (1) dried or calcined at, for example, 450° F. to produce a high grade alumina, or (2) it is mixed with the furnace feed to enrich the alumina content of the ore so that the water and acid digestion steps are facilitated, or (3) it is mechanically mixed with the furnace products to obtain high alumina raw materials.

The calcium hydroxide solution remaining from the aluminum hydroxide precipitation step is available for utlization as recycle to the perlite pre-treatment step and/or in the production of by-products such as calcium oxalate (obtained by treatment of the solution with oxalic acid), calcium silicate, calcium phosphate, and the like.

The separation of the furnace products into the three classifications is advantageous since a latitude in the choice of materials fed to the digestors becomes possible. The variance is found in both chemical and physical characteristics. For example, the ultra-fine baghouse product is higher in cation content (calcium, sodium, magnesium) and thus is more reactive in water or acid media, and likewise exposes a greater surface area than the coarse, less reactive, product from the first classifier. In effect, this peculiarity of the process permits a choice of richness in feed selections to both water and acid digestors, thus providing a flexibility quite unlike other processes.

Another very evident advantage of processing perlitic or pumiceous materials by the present process lies in the high filterability of partially unreacted sludges obtained at the digestors. The lightweight, porous structure, as well as the particle shape common only to such materials as perlite and pumice, is a definite aid in filtration, greater flow rates through filters producing greater volumes of filtrate per hour than when ordinary clays or shales are being reacted. This improved production rate is attributable to the ability of unreacted perlitic particles to disperse the silicous and aluminous slimes encountered from fully reacted particles and thereby build a lightweight, porous filter cake which can be readily washed free of valuables.

The specific example as described below and shown on the flow sheet is illustrative of the process of the present invention, but it is to be understood that the invention is not to be limited to the specific details thereof. In the following specific example, the Arabic numerals in parentheses refer to the designated steps as shown in the accompanying flow sheet:

Crude perlite ore was washed and screened (1), the chemical and screen analyses being as follows:

| Analysis (Chemical), percent | Analysis (Screen), percent | | |
|---|---|---|---|
| $SiO_2$ _____ 73.4 | +50 Mesh____ 4.2 | _____ | |
| $Al_2O_3$ _____ 13.6 | +60_____ 10.6 | 14.8 | |
| $Fe_2O_3$ _____ 0.28 | +70_____ 12.8 | 27.6 | |
| CaO _____ 0.50 | +80_____ 12.0 | 39.6 | |
| MgO _____ (¹) | +100 Mesh___ 13.4 | 52.0 | |
| $Na_2O$ _____ 4.3 | +200 Mesh___ 34.9 | 86.9 | |
| $K_2O$ _____ 4.6 | Pan_____ 13.1 | 100.0 | |
| Loss on Ignition__ 3.2 | | | |
| 99.9 | | | |

¹ Trace.

This material was treated (2) by spraying a hot concentrated solution of calcium chloride onto the crushed rock on the basis of 6.4 lbs. $CaCl_2$ (dry basis) per 10 lbs. of perlite ore.

The treated material was dried (3) at about 450° F. to a moisture content of about 5% as free moisture. The analysis of the dried material was as follows:

| | Percent |
|---|---|
| $SiO_2$ | 44.5 |
| $Al_2O_3$ | 7.7 |
| $CaCl_2$ | 39.1 |
| Salts+$H_2O$ | 8.8 |
| | 100.0 |

This material was fired through the expansion furnace (4) at about 1800° F., the exposure time being about 1 minute, to exfoliate the particles, which were air classified (5) into the following fractions:

Coarse Particles (6) Appx. 60% by weight
(−10+20 mesh)

| | Percent |
|---|---|
| $SiO_2$ | 47.1 |
| $Al_2O_3$ | 3.4 |
| CaO | 36.4 |
| Salts | 13.1 |
| | 100.0 |

Fine Particles (7) Appx. 30% by weight
(−20+150 mesh)

| | Percent |
|---|---|
| $SiO_2$ | 42.6 |
| $Al_2O_3$ | 14.1 |
| CaO | 32.6 |
| Salts | 10.7 |
| | 100.0 |

Air Float or Ultra Fine (8) Appx. 10% by weight
(−150+400 mesh)

| | Percent |
|---|---|
| $SiO_2$ | 36.5 |
| $Al_2O_3$ | 14.2 |
| CaO | 38.7 |
| Salts | 10.6 |
| | 100.0 |

The coarse fraction (6) was subjected to digestion (9) in hot water on a basis of 2.5 lbs. of water per 1 lb. of solids for a period of about 30 minutes in a paddle-equipped tank, and separated (10) into overflow and underflow. The overflow from the tank comprised the bulk of the expanded particles and water soluble constituents, and the underflow comprised the unexpanded particles and some solubles such as calcium chloride.

The overflow represented about 26.0% by weight (dry basis) of the furnace feed, the analyses being as follows:

Analysis—Overflow

| | Percent |
|---|---|
| $SiO_2$ | trace |
| $Al_2O_3$ | trace |
| CaO | 35.8 |
| Salts+$H_2O$ | 64.2 |
| | 100.0 |

Analysis—Underflow

| | Percent |
|---|---|
| $SiO_2$ | 87.8 |
| $Al_2O_3$ | 5.7 |
| CaO | 2.2 |
| Salts+$H_2O$ | 4.7 |
| | 100.0 |

The underflow was recirculated to the calcium chloride make-up as shown. The overflow was admixed with the fine particles (7) and digested (11) in concentrated hydrochloric acid on a basis of 3 lbs. of acid per 1 lb. of solids for 30 minutes. The digestion mixture was filtered (12), the filter cake representing about 22.8% of the feed to the furnace. This cake was divided into three equal parts, one part going to the dryer (3), one part was recirculated to the digestion (11), and the third part used as described below.

The filtrate from the filtration (12), amounting to about 72.2% of the feed to the filtration step, was pan dried (13) at about 220° F. and milled (14). The analyses of the cake and filtrate was as follows:

Analysis—Cake

| | Percent |
|---|---|
| $SiO_2$ | 82.0 |
| $Al_2O_3$ | 9.3 |
| CaO | 1.9 |
| Salts+$H_2O$ | 6.8 |
| | 100.0 |

Analysis—Filtrate

| | Percent |
|---|---|
| SiO | 0.2 |
| $AlCl_3$ | 26.6 |
| $CaCl_2$ | 56.8 |
| Salts+$H_2O$ | 16.4 |
| | 100.0 |

It will be noted that the filtrate was very low in silica and relatively high in aluminum chloride. The dried filtrate could be operated on for the production of high grade alumina, but in this example it was sent to the second-stage hydrochloric acid digestion (15) along with the ultra-fines (8). The feed to the digestion step consisted of about 82% of the originally treated and dried perlite rock. The digestion (15) was carried out with concentrated hydrochloric acid on a basis of 2.5 lbs. of HCL per 1.5 lbs. of solids for about 30 minutes. The analysis of the feed to the digestion was as follows:

| | Percent |
|---|---|
| $SiO_2$ | 4.4 |
| $Al_2O_3$ | 17.6 |
| CaO | 69.1 |
| Salts+$H_2O$ | 8.4 |
| | 99.5 |

Precipitation (16) of aluminum hydroxide was carried out at pH 6.8 by use of ammonium hydroxide and the mixture filtered (17).

The filter cake was commingled with the remaining one-third of the cake from filtration (12) and dried (18)

as substituted bauxite. The composition of this product (19) is shown by the following analysis:

| | Percent |
|---|---|
| $SiO_2$ | 57.9 |
| $Al_2O_3$ | 36.8 |
| CaO | 0.8 |
| $Na_2O$ | 2.2 |
| $K_2O$ | 2.3 |
| MgO | trace |
| | 100.0 |

The filtrate from (17) now consisted almost entirely of calcium hydroxide in solution with the other salts. This filtrate product (20) is available for byproduct production as described above, and/or for acidification and recirculation to the calcium chloride make-up.

Having fully described my invention it is to be understood that I am not to be limited to the details herein set forth but that my invention is of the full scope of the appended claims.

I claim:
1. In a process for the treatment of heat-expandable volcanic glasses of silicious-aluminous nature, the steps comprising admixing particles thereof with a concentrated aqueous solution of an alkali or alkaline earth metal chloride in sufficient proportion to combine with at least a portion of the aluminum in said particles, the amount of said chloride being above about 25%, based on the weight of said particles, drying said admixture at a temperature up to about 850° F., heating said admixture at a temperature in the range between about 1200 and 2000° F. for a time sufficient to expand the particles and to react said chloride salt with the particle constituents, cooling the expanded particles, digesting said particles in water to remove unreacted soluble materials and separating the expanded particles and soluble materials, admixing the separated expanded particles with concentrated hydrochloric acid and digesting said admixture, separating the resulting solution containing acid soluble materials including aluminum chloride from the solids, and neutralizing the solution to precipitate aluminum hydroxide.

2. The process of claim 1 wherein said volcanic glasses comprise perlite.

3. The process of claim 1 wherein the temperature is in the range of 1400–1800° F., and wherein the chloride salt is calcium chloride.

References Cited

UNITED STATES PATENTS

| 1,868,499 | 7/1932 | Guertler | 23—143 |
| 2,602,782 | 7/1952 | Zoradi | 71—64 |
| 1,621,160 | 12/1952 | Johnson et al. | 252—378 |
| 2,898,303 | 8/1959 | Houston | 252—378 |
| 2,904,424 | 9/1959 | Chapman et al. | 71—64 |
| 3,062,753 | 11/1962 | Hayes | 252—378 |
| 3,076,546 | 2/1963 | Ziegler et al. | 252—378 |
| 2,904,424 | 9/1959 | Chapman et al. | 252—378 |
| 3,062,753 | 11/1962 | Hayes | 252—378 |

OSCAR R. VERTIZ, Primary Examiner.

HERBERT T. CARTER, Assistant Examiner.

U.S. Cl. X.R.

23—92; 252—378